(12) United States Patent
Chung et al.

(10) Patent No.: US 6,417,972 B1
(45) Date of Patent: Jul. 9, 2002

(54) HIGH-RESOLUTION VARIABLE FOCUS LENS HAVING AN EXTRA-LONG BACK FOCAL LENGTH WITH TELECENTRIC DESIGN

(75) Inventors: Feng-Chao Chung, Hsinchu; Fu-Ming Chuang, Hsinchu Hsien, both of (TW)

(73) Assignee: Industrial Technology Research Institute, Hsinchu (TW)

( * ) Notice: Subject to any disclaimer, the term of this patent is extended or adjusted under 35 U.S.C. 154(b) by 154 days.

(21) Appl. No.: 09/655,152

(22) Filed: Sep. 5, 2000

(30) Foreign Application Priority Data

Dec. 2, 1999 (TW) ........................ 88121080 A (51) Int. Cl.⁷ .......................... G02B 13/22; G02B 15/14
(52) U.S. Cl. ...................... 359/663; 359/676; 359/682; 359/683; 359/680; 359/689
(58) Field of Search ................. 359/676–690, 359/663

(56) References Cited

U.S. PATENT DOCUMENTS

| | | | | |
|---|---|---|---|---|
| 5,229,886 A | * | 7/1993 | Tanaka | 359/683 |
| 5,416,639 A | * | 5/1995 | Yamanashi | 359/683 |
| 6,137,638 A | * | 10/2000 | Yamagishi et al. | 359/682 |

* cited by examiner

Primary Examiner—Georgia Epps
Assistant Examiner—M. Hasan
(74) Attorney, Agent, or Firm—J. C. Patents (57) ABSTRACT

A high-resolution variable focus lens system that has an extra-long back focal length with a telecentric design. The lens system includes three groups of lenses between an object (screen) and an image (a liquid crystal panel). The first group of lenses, comprising three lenses and having a negative power, is used for focusing and zooming of the lens system. The second group of lenses, comprising two lenses and having also a negative power, is used for zooming of the lens system. The third group of lenses, comprising six lenses and having a positive power, is similarly used for zooming of the lens system.

17 Claims, 11 Drawing Sheets

HIGH-RESOLUTION VARIABLE FOCUS LENS HAVING AN EXTRA-LONG BACK FOCAL LENGTH WITH TELECENTRIC DESIGN

CROSS-REFERENCE TO RELATED APPLICATION

This application claims the priority benefit of Taiwan application serial no. 88121080, filed Dec. 2, 1999.

BACKGROUND OF THE INVENTION

1. Field of the Invention

The present invention relates to a variable focus lens system. More particularly, the present invention relates to a high-resolution variable lens system having an extra-long back focal length with telecentric design.

2. Description of the Related Art

Because of an increase in the resolution of the liquid crystal display panel inside a liquid crystal projector, image resolution of the projection lens system must increase correspondingly. An earlier version of liquid crystal display panel was a transparent type, and hence overall image resolution was lower. When the liquid crystal panel is implemented in a projector, the projection lens associating with the display panel usually does not need a long back working distance, because it typically uses a dichromic prism to perform color synthesis.

In recent years, however, a reflective liquid crystal display panel having more than one million thirty thousand pixels, with each pixel size smaller than 20 micrometers, has been developed. To use the reflective liquid crystal panel in a projector, sufficient space must be reserved between the liquid crystal panel and the projection lens system for positioning a polarizing beam splitter prism and a dichromic cross prism. In other words, the projection lens must have a sufficiently long back working distance for housing the two optical components. In addition, when incident light is perpendicular to the liquid crystal panel, a relatively good contrast is obtained on the liquid crystal panel. Further, the dichromic prism also does not need a gradient coating to form the dichromic coating film thereon, and the fabrication is reduced. In this consideration, an illuminating system of the projector generally takes a telecentric design. This means that the exit pupil of the illuminating system is positioned at a rather infinite distance.

In order to achieve the highest efficiency of light output, the projection lens must be a telecentric design associating with the illuminating system. An another advantage of the telecentric protection lens is that an uneven magnification power caused by location errors while adjusting position of the liquid crystal display panel can be reduced. Particularly, as the pixel size of the display panel is greatly small, the telecentric projection lens allows the adjustment of the display panel to be much easier. This also can further reduce the fabrication cost.

Conventional protection lens assemblies, such as the inventions described in Japanese patents No. JP8036132 and No. JP8201690, have a sufficiently long back focal length. However, they are not a telecentric design. Although the invention described in the Japanese patent No. JP8297243 has a sufficiently long back focal length as well as a telecentric design, the projecting angle is too small.

SUMMARY OF THE INVENTION

Accordingly, one object of the present invention is to provide a high-resolution variable focus lens system having an extra-long back focal length with telecentric design. The lens system can be used in a liquid crystal projector that requires a long back focal length and has a large number of pixels. Not only is the lens system capable of producing a high-quality, high-resolution image, but the angle of projection of the lens system is large sufficiently for producing a large image within a relatively short projection length.

To achieve these and other advantages and in accordance with the purpose of the invention, as embodied and broadly described herein, the invention provides an optical component. The optical component includes a high-resolution variable focus lens system having an extra-long back focal length with telecentric design. From the screen to the image (liquid crystal panel), the high-resolution variable focus lens system includes three groups of lenses in sequence. A first group of lenses is used for focusing and zooming. The first group of lenses having negative power includes three lenses counting from one to three. A second group of lenses is used for zooming. The second group of lenses having negative power includes two lenses counting from four to five. A third group of lenses is also used for zooming. The third group of lenses having positive power includes six lenses counting from six to eleven.

Focal length of the lens system can be changed by varying the distance between the first group and the second group of lenses as well as the second group and the third group of lenses along the optical axis. The variable focus lens system must satisfy the following conditions:

$$2.15f_W \leq |f_1| \leq 2.89f_W; \quad (1)$$

$$4.86f_W \leq |f_2| \leq 9.82f_W; \quad (2)$$

$$1.65f_W \leq f_3 \leq 1.74f_W; \quad (3)$$

$$0.37f_3 \leq t_{12} \leq 0.42f_3; \quad (4)$$

and $$N_6 \geq 1.66, \quad (5)$$

where $f_1$ to $f_3$ are the focal lengths of the first, the second and the third group of lenses, respectively; $f_W$ is the focal length of the variable focus lens system at wide angle; and $t_{12}$ is the distance on the optical axis between the sixth lens and the seventh lens while $N_6$ is the refractive index of the sixth lens.

According to the embodiment of this invention, a high-resolution variable focus lens system with a long back focal length, a telecentric design, and a wider projection angle is achieved. The lens system is capable of producing a high-quality image at various projection distances. When the lens system is used inside a liquid crystal projector that requires a long working distance and a high resolution, sufficient space is reserved for implementing a polarizing beam splitter prism and a dichromic cross prism. Furthermore, the liquid crystal display panel can be easily aligned. In addition, if a large image needs to be projected, only a relatively short projection distance is demanded.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
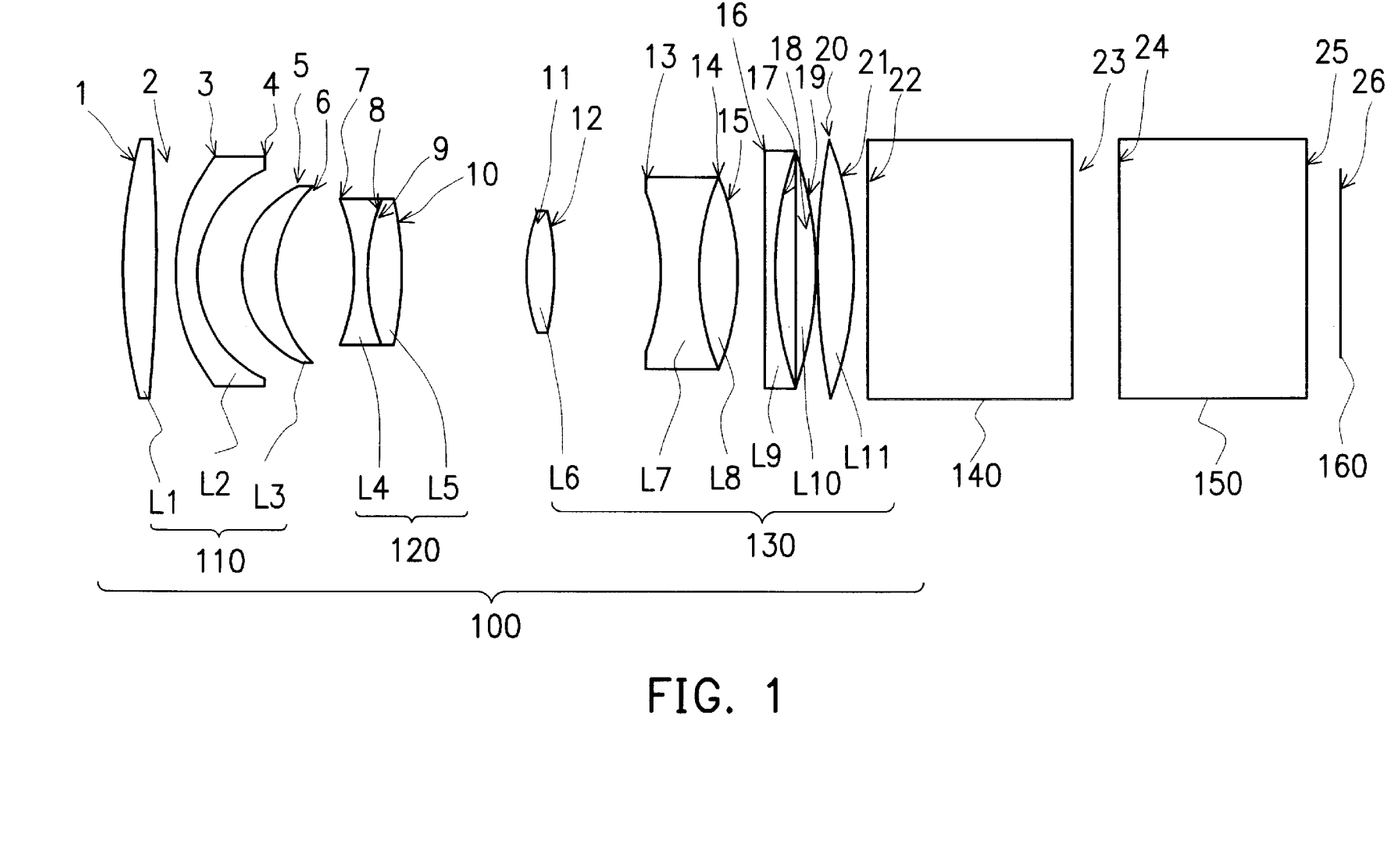
FIG. 1 is a schematic side view of the components of a variable focus lens system according to a first preferred embodiment of this invention.

FIG. 1 is a schematic side view of the components of a variable focus lens system 100 according to a first preferred embodiment of this invention. As shown in FIG. 1, the lens system 100 includes three groups of lenses from the object side (screen) to the imaging side (liquid crystal panel 160). The first group of lenses 110, with a negative power, is used for performing focusing and zooming function by employing three lenses L1, L2 and L3. The first lens L1 is a positive lens such as a biconvex lens. The second lens L2 is a negative lens such as a meniscus lens with a convex surface facing the screen. The third lens L3 is a positive lens such as a meniscus lens with a convex surface facing the screen. The second group of lenses 120, with a negative power, is used for performing zoom function of the lens system by employing two lenses. The fourth lens L4 is a negative lens such as a biconcave lens. The fifth lens L5 is a positive lens such as a biconvex lens. The fourth lens L4 and the fifth lens L5 may be cemented together. The third group of lenses 130, with a positive power, is also used for performing zoom function of the lens system by employing six lenses. The sixth lens L6 is a positive lens such as a biconvex lens with the surface having the larger radius of curvature facing the screen. The seventh lens L7 is a negative lens such as a biconcave lens. The eighth lens L8 is a positive lens such as a biconvex lens with the surface having the larger radius of curvature facing the image side. The lenses L7 and L8 may be cemented together. The ninth lens L9 is a negative lens such as a meniscus lens with the surface having the larger radius of curvature facing the image side. The tenth lens L10 is a positive lens such as a plano-convex lens with the planar surface facing the screen side. The eleventh lens L11 is a positive lens such as a biconvex lens.

Focal length of the lens system can be changed by varying the distance between the first and the second group of lenses as well as the second and third group of lenses along the optical axis. The variable focus lens system must satisfy the following conditions:

$$2.15 f_W \leq |f_1| \leq 2.89 f_W; \quad (1)$$

$$4.86 f_W \leq |f_2| \leq 9.82 f_W; \quad (2)$$

$$1.65 f_W \leq f_3 \leq 1.74 f_W; \quad (3)$$

$$0.37 f_3 \leq t_{12} \leq 0.42 f_3; \quad (4)$$

$$N_6 \geq 1.66, \text{ and} \quad (2)$$

where $f_1$ to $f_3$ are the focal lengths of the first, the second and the third group of lenses, respectively, $f_W$ is the focal length of the variable focus lens system at wide angle, and $t_{12}$ is the distance along the optical axis between the sixth lens and the seventh lens while $N_6$ is the refractive index of the sixth lens.

In Table 1 below, optical values of the various curving surfaces of the lenses L1–L11 are listed. No. 1–22 in Table 1 corresponds to the lens surface labeled from 1 to 22 for lenses L1–L11. Column R shows the radius of curvature of the lens surfaces, column D shows either the thickness of the lenses or the distance of separation from a neighboring lens, and column N shows the refractive index and chromatic dispersion of wavelength in d line.

TABLE 1

| $F_{NO}$ = 3.30–3.46; f= 49.77–69.68; ω = 49.56°–36.5° | | | |
|---|---|---|---|
| Surface Number | R | T | N |
| 1 | 183.12 | 5.11 | 806000.407 |
| 2 | −1022.77 | 2.31 | AIR |
| 3 | 126.24 | 2.40 | 806000.407 |
| 4 | 31.25 | 9.83 | AIR |
| 5 | 29.88 | 4.31 | 805544.32 |
| 6 | 34.58 | 17.92 | AIR |

TABLE 1-continued $F_{NO} = 3.30$–$3.46$; f= $49.77$–$69.68$; ω = $49.56°$–$36.5°$

| Surface Number | R | T | N |
|---|---|---|---|
| 7 | −66.96 | 2.00 | 595305.353 |
| 8 | 38.61 | 0.75 | AIR |
| 9 | 44.24 | 6.09 | 805501.3158 |
| 10 | −282.39 | 38.09 | AIR |
| STO | 63.16 | 4.18 | 665235.4318 |
| 12 | −165.95 | 34.27 | AIR |
| 13 | −34.49 | 6.68 | 761070.2933 |
| 14 | 146.96 | 7.73 | 630219.5773 |
| 15 | −56.93 | 8.95 | AIR |
| 16 | 678.37 | 2.20 | 805287.3028 |
| 17 | 93.77 | 4.01 | AIR |
| 18 | −2417.10 | 6.61 | 542958.6403 |
| 19 | −69.84 | 0.20 | AIR |
| 20 | 88.59 | 9.51 | 724916.5152 |
| 21 | −142.63 | 1.50 | AIR |
| 22 | INFINITY | 45.00 | 516800.6417 |
| 23 | INFINITY | 10.00 | AIR |
| 24 | INFINITY | 35.00 | 717359.2951 |
| 25 | INFINITY | 8.00 | AIR |
| IMG | INFINITY | 0.00 | |

In the first embodiment of this invention, the tele focal length $f_T$ and the wide focal length $f_W$ of the variable focus lens system 100 are 69.68 mm and 49.77 mm, respectively. In addition, the focal length of various group of lenses is $f_1 = -117.48$ mm, $f_2 = -364.75$ mm, $f_3 = 83.67$ mm, distance between lens surfaces 12 and 13 along the optical axis is $t_{12} = 34.27$ mm and refractive index of lens L6 is $N_6 = 1.6652$.

Figure 2A:
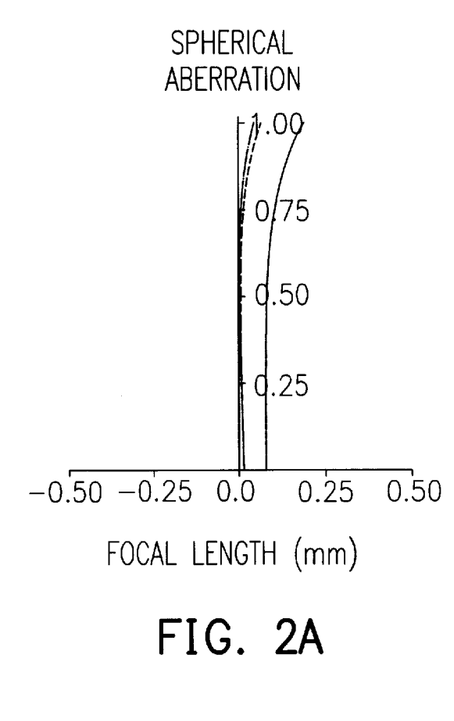
FIGS. 2A through 2C are drawings, respectively showing the spherical aberration, astigmatism and distortion at wide projection with 4.3 m object distance (screen side) for the variable focus lens system according to the first preferred embodiment of this invention.
Figure 2B:
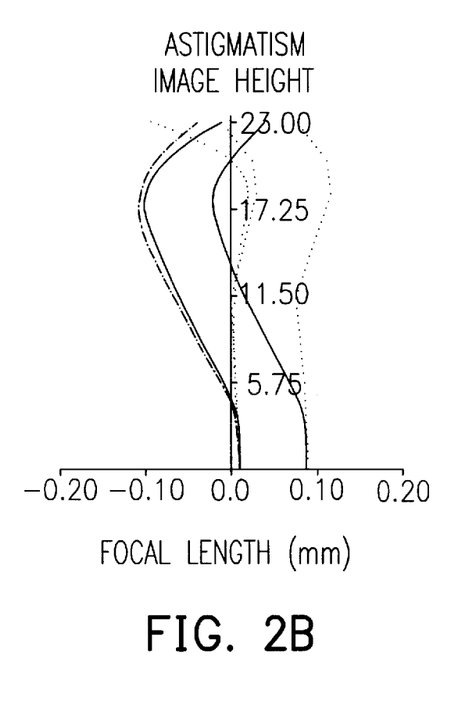
Figure 2C:
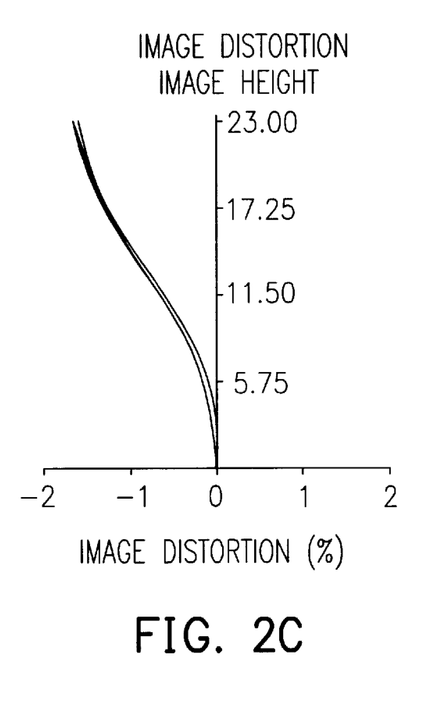
Figure 3A:
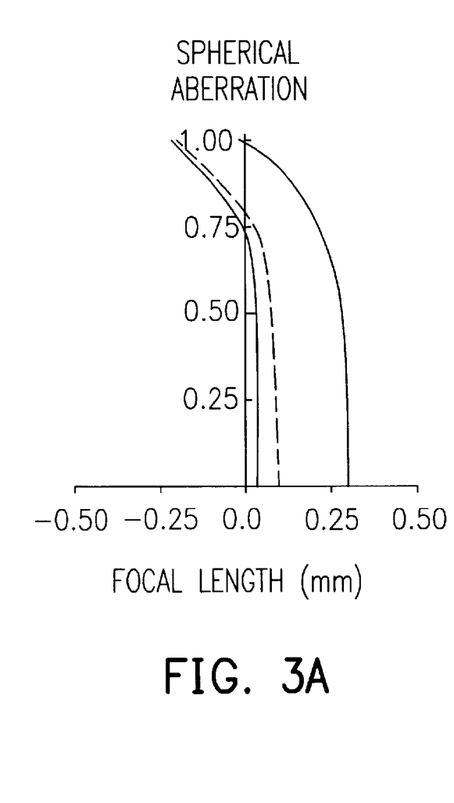
FIGS. 3A through 3C are drawings, respectively showing the spherical aberration, astigmatism and distortion at tele projection with 4.3 m object distance (screen side) for the variable focus lens system according to the first preferred embodiment of this invention.
Figure 3B:
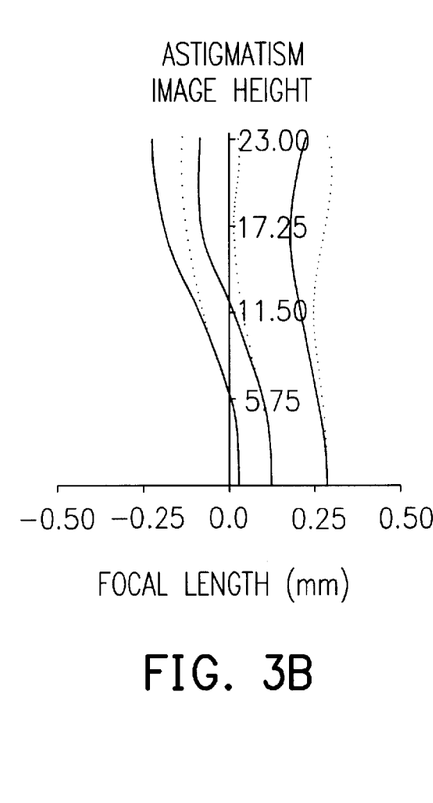
Figure 3C:
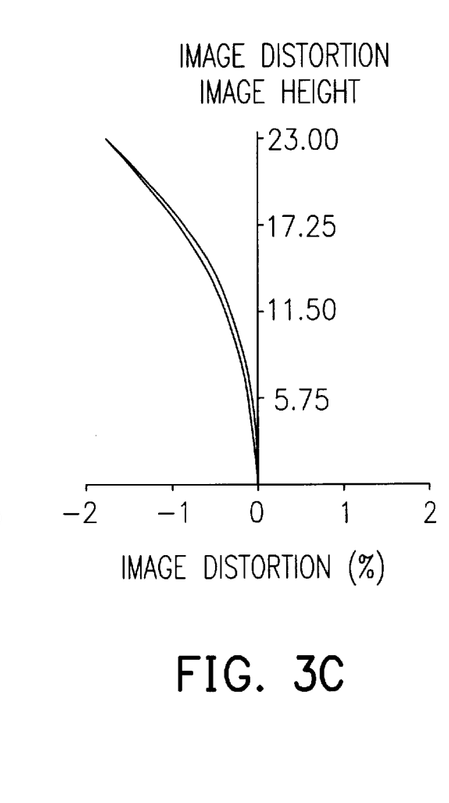

Furthermore, FIGS. 2A throug 2C are drawings, respectively showing the spherical aberration, astigmatism and distortion when the lens system 100 is operating at wide mode with a focal length $f_W = 49.77$ mm and an object distance of 4.3 m. FIGS. 3A throug 3C are drawings, respectively showing the spherical aberration, astigmatism and distortion when the lens system 100 is operating in tele mode with focal length $f_T = 69.68$ mm and an object distance of 4.3 m.

Figure 4A:
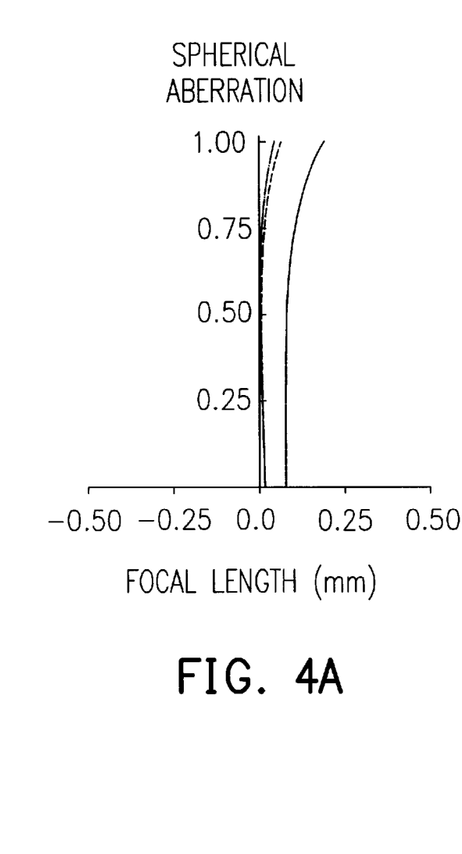
FIGS. 4A through 4C are drawings, respectively showing the spherical aberration, astigmatism and distortion at wide projection with 2.0 m object distance (screen side) for the variable focus lens system according to the first preferred embodiment of this invention.
Figure 4B:
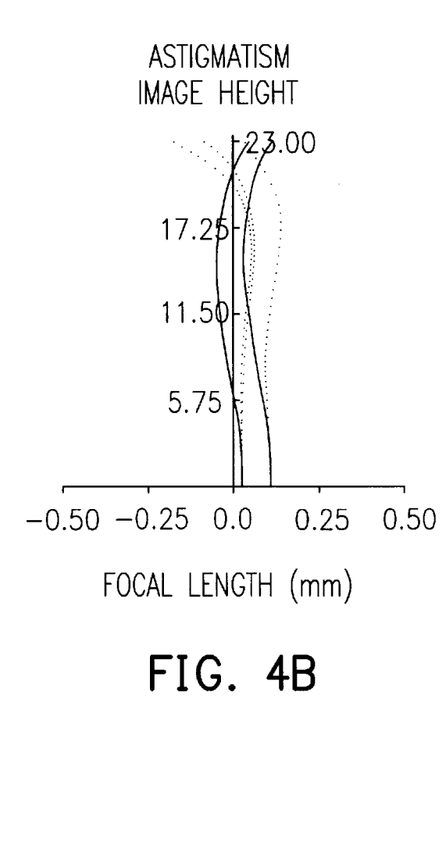
Figure 4C:
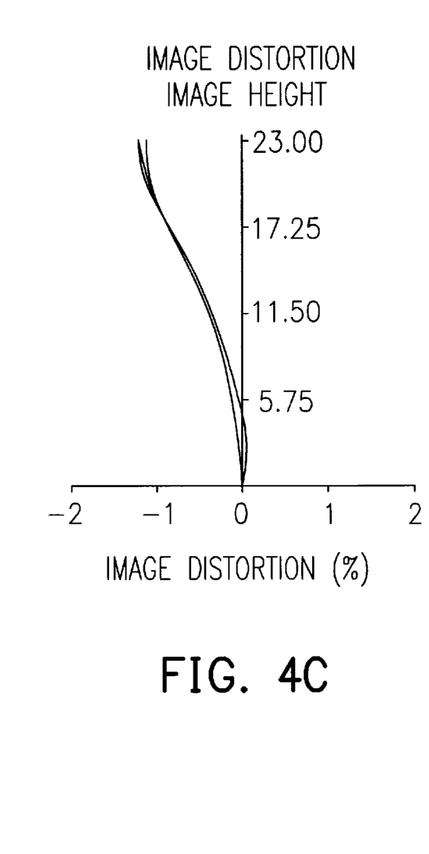
Figure 5A:
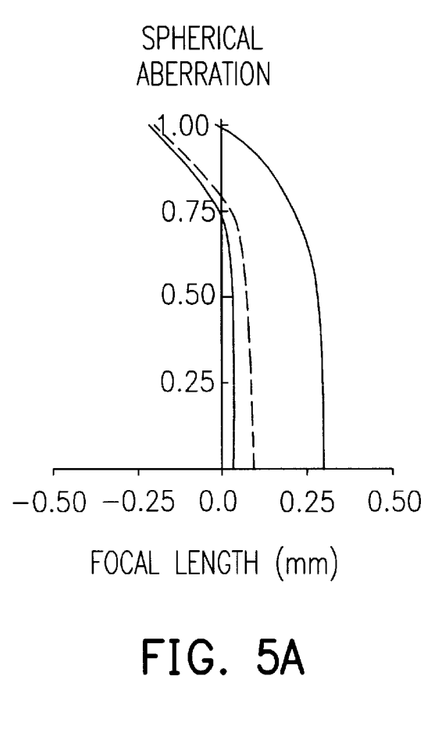
FIGS. 5A through 5C are drawings, respectively showing the spherical aberration, astigmatism and distortion at tele projection with 2.0 m object distance (screen side) for the variable focus lens system according to the first preferred embodiment of this invention.
Figure 5B:
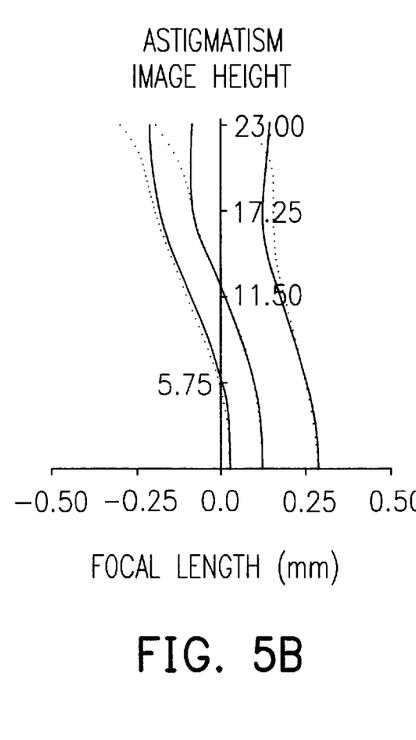
Figure 5C:
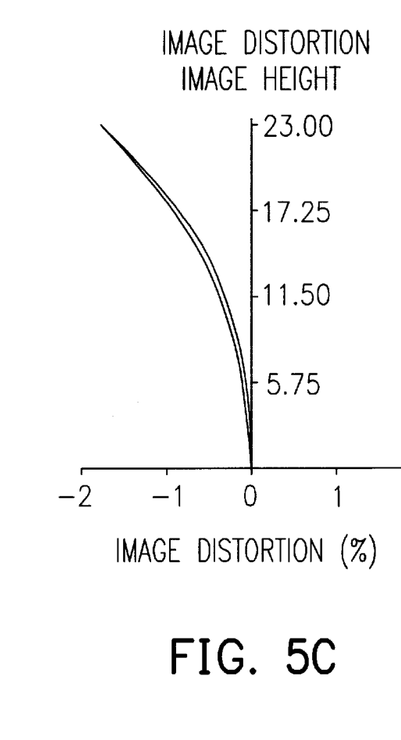

FIGS. 4A through 4C are graphs showing the respective spherical aberration, astigmatism and distortion when the lens system 100 is operating at wide mode with focal length $f_W = 49.77$ mm and an object distance of 2 m. Finally, FIGS. 5A through 5C are graphs showing the respective spherical aberration, astigmatism and distortion when the lens system 100 is operating in tele mode with focal length $f_T = 69.68$ mm, and an object distance of 2 m.

Figure 6:
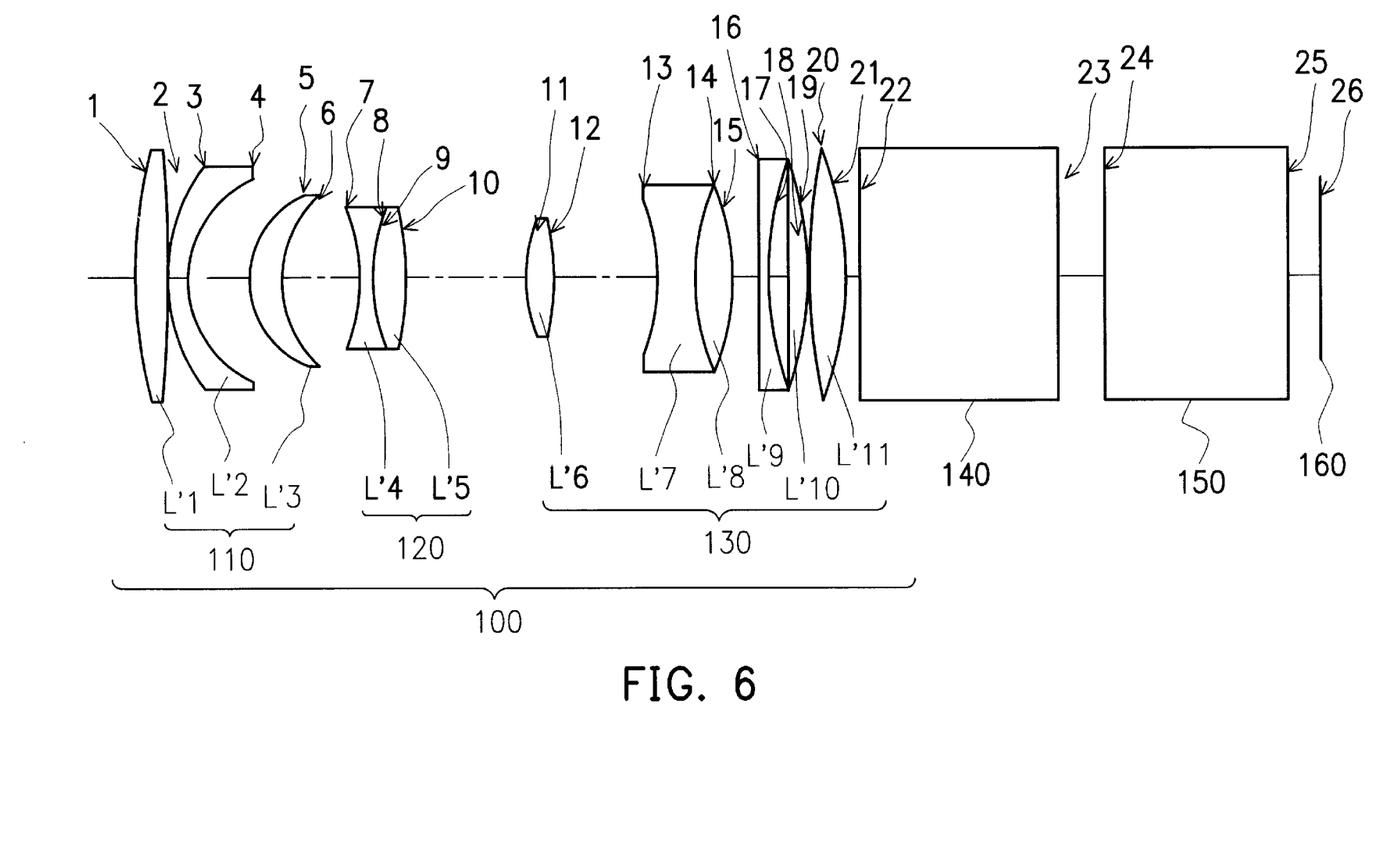
FIG. 6 is a schematic side view of the components of a variable focus lens system according to a second preferred embodiment of this invention.

FIG. 6 is a schematic side view of the components of a variable focus lens system 100 according to a second preferred embodiment of this invention. Conditions that must be satisfied by the lens groups 110–130 in FIG. 6 are identical to the conditions (1) to (5) in the first embodiment of this invention.

In Table 2 below, optical values of the various surfaces of the lenses L'1–L'11 are listed. No. 1–22 in Table 2 corresponds to the lens surfaces labeled from 1 to 22 for lenses L'1–L'11. The meaning of each column is identical to the columns in Table 1 of the first embodiment.

TABLE 2

$F_{NO} = 3.34$–$3.42$; f = $52.12$–$72.97$; ω = $47.5°$–$34.94°$

| Surface Number | R | T | N |
|---|---|---|---|
| 1 | 206.63 | 5.29 | 806000.41 |
| 2 | −477.02 | 0.20 | AIR |

TABLE 2-continued $F_{NO} = 3.34$–$3.42$; f = $52.12$–$72.97$; ω = $47.5°$–$34.94°$

| Surface Number | R | T | N |
|---|---|---|---|
| 3 | 158.50 | 3.00 | 806000.41 |
| 4 | 36.81 | 13.76 | AIR |
| 5 | 35.05 | 3.72 | 805000.26 |
| 6 | 39.85 | 15.04 | AIR |
| 7 | −51.25 | 2.00 | 526138.50 |
| 8 | 1039.11 | 0.00 | AIR |
| 9 | 1039.11 | 3.68 | 806000.41 |
| 10 | −121.22 | 44.83 | AIR |
| STO | 62.97 | 4.03 | 764427.41 |
| 12 | −258.44 | 32.68 | AIR |
| 13 | −38.00 | 9.00 | 796322.26 |
| 14 | 161.69 | 11.00 | 547514.64 |
| 15 | −69.17 | 8.53 | AIR |
| 16 | −3875.38 | 2.20 | 763966.27 |
| 17 | 106.44 | 3.39 | AIR |
| 18 | 3857.59 | 6.33 | 713000.54 |
| 19 | −80.56 | 0.20 | AIR |
| 20 | 86.44 | 8.53 | 788476.42 |
| 21 | −238.24 | 2.34 | AIR |
| 22 | INFINITY | 45.00 | 516800.64 |
| 23 | INFINITY | 10.00 | AIR |
| 24 | INFINITY | 35.00 | 717359.30 |
| 25 | INFINITY | 8.00 | AIR |
| IMG | INFINITY | 0.00 | |

In the second embodiment of this invention, the tele focal length $f_T$ and the wide length $f_W$ of the variable focus lens system 100 are 72.97 mm and 52.12 mm, respectively. In addition, the focal length of various groups of lenses are $f_1 = -143.83$ mm, $f_2 = -319.94$ mm, $f_3 = 86.05$ mm, distance between lenses L'6 and L'7 along the optical axis is $t_{12} = 32.68$ mm and refractive index of lens L'6 is $N_6 = 1.7644$.

Figure 7A:
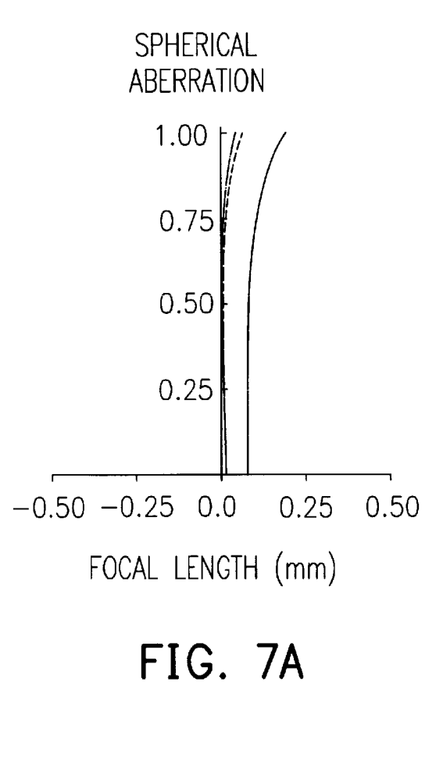
FIGS. 7A through 7C are drawings, respectively showing the spherical aberration, astigmatism and distortion at wide projection with 4.3 m object distance (screen side) for the variable focus lens system according to the second preferred embodiment of this invention.
Figure 7B:
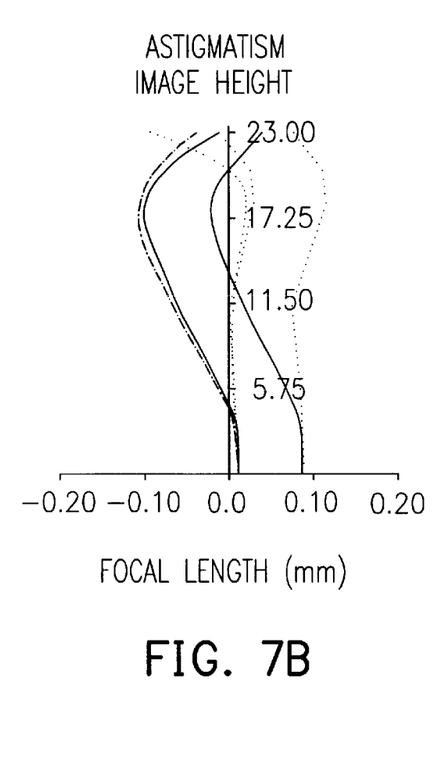
Figure 7C:
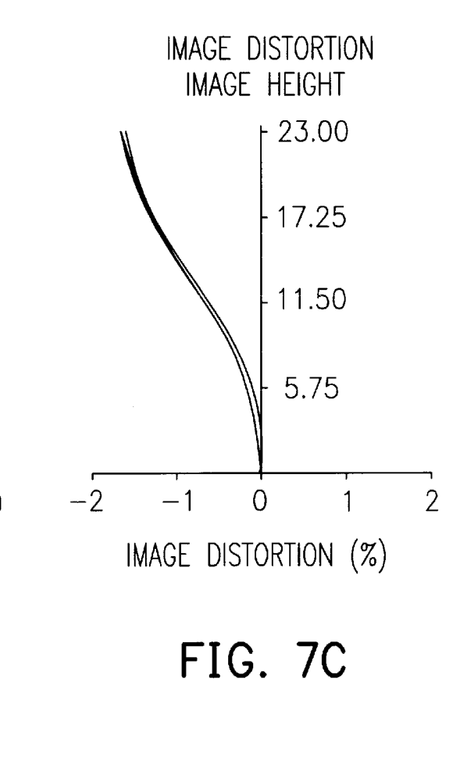
Figure 8A:
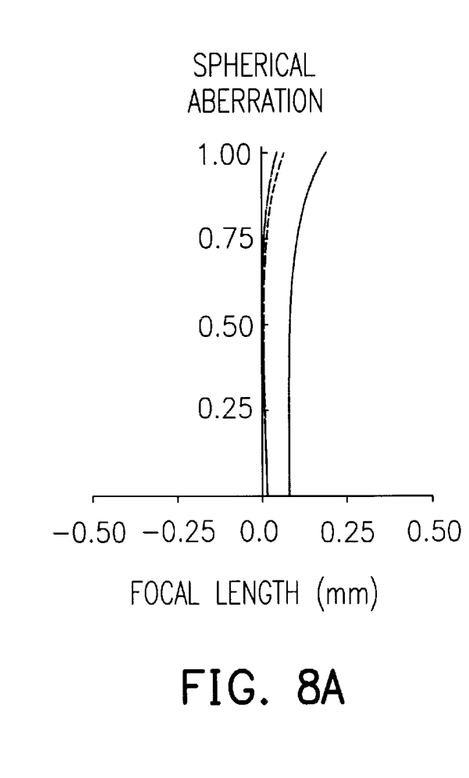
FIGS. 8A throug 8C are drawings, respectively showing the spherical aberration, astigmatism and distortion at tele projection with 4.3 m object distance (screen side) for the variable focus lens system according to the second preferred embodiment of this invention.
Figure 8B:
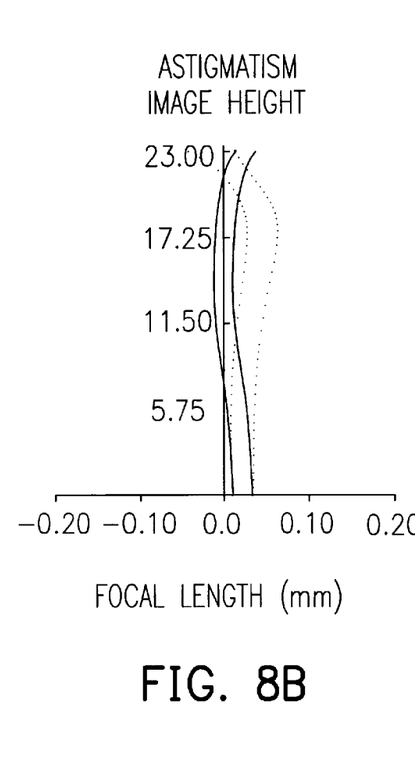
Figure 8C:
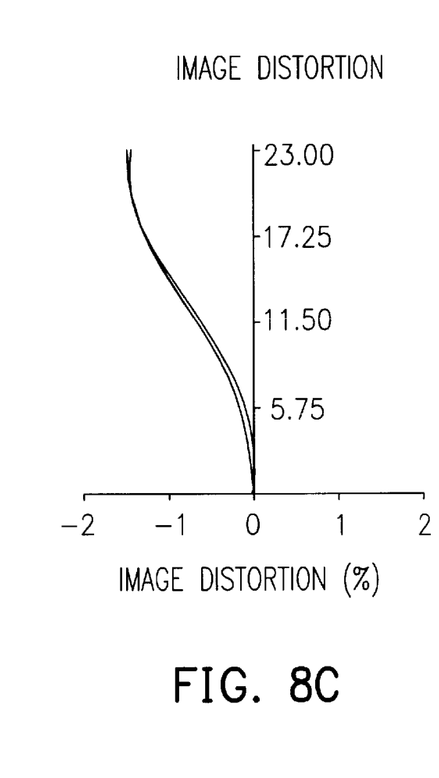

Furthermore, FIGS. 7A throug 7C are drawings, respectively showing the spherical aberration, astigmatism and distortion when the lens system 100 is operating at wide mode with focal length $f_W = 52.12$ mm and an object distance of 4.3 m. FIGS. 8A throug 8C are drawings, respectively showing the spherical aberration, astigmatism and distortion when the lens system 100 is operating in tele mode with focal length $f_T = 72.97$ mm and an object distance of 4.3 m.

Figure 9A:
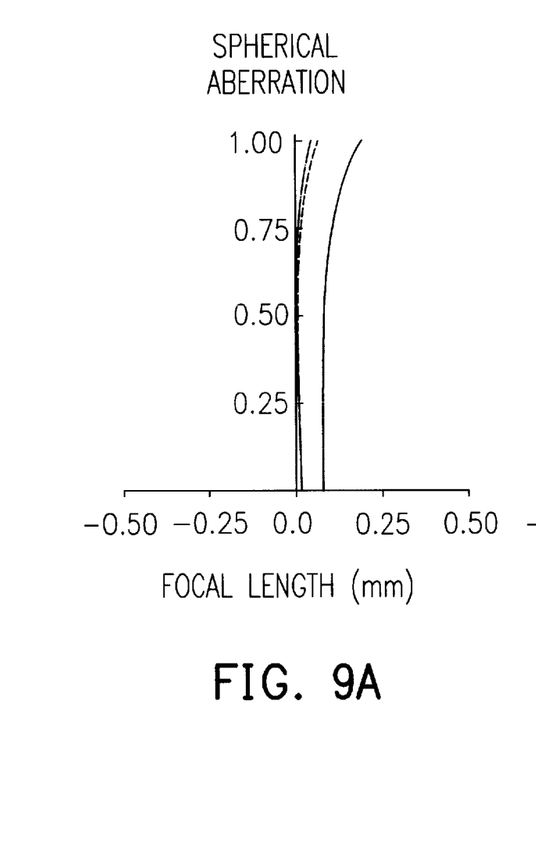
FIGS. 9A throug 9C are drawings, respectively showing the spherical aberration, astigmatism and distortion at wide projection with 2.0 m object distance (screen side) for the variable focus lens system according to the second preferred embodiment of this invention.
Figure 9B:
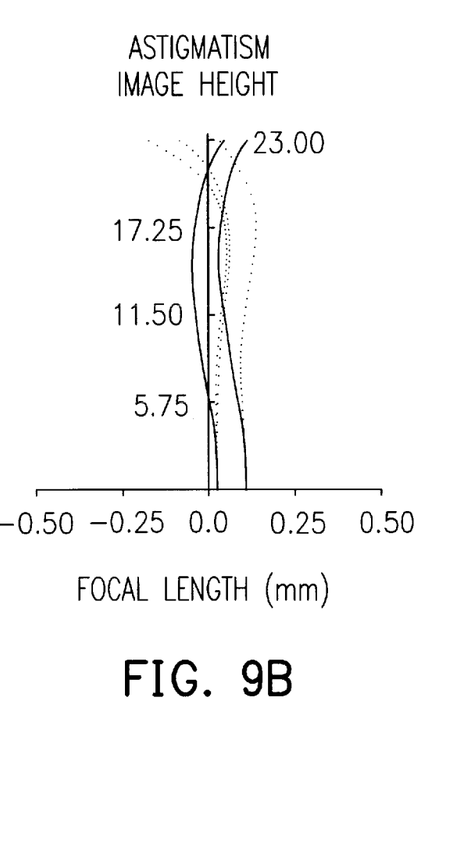
Figure 9C:
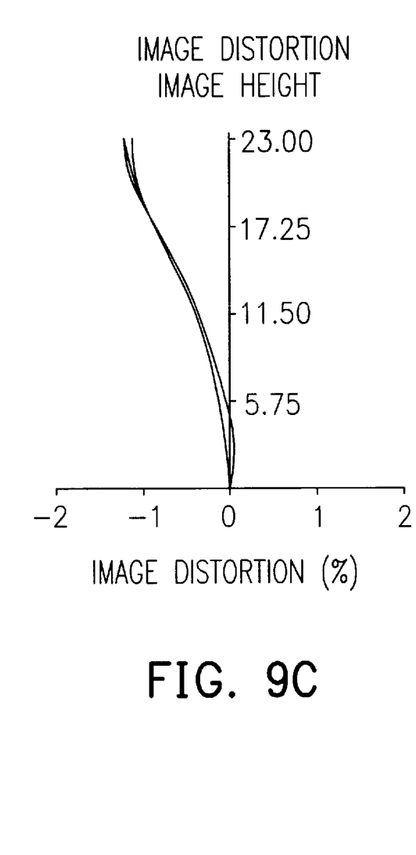
Figure 10A:
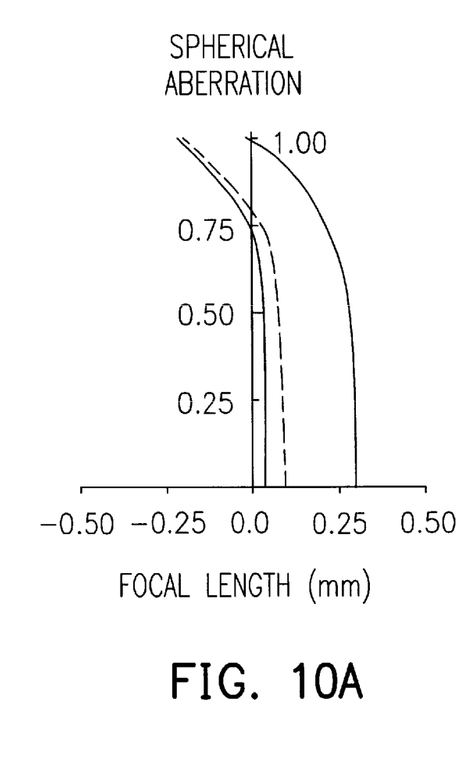
FIGS. 10A throug 10C are drawings, respectively showing the spherical aberration, astigmatism and distortion at tele projection with 2.0 m object distance (screen side) for the variable focus lens system according to the second preferred embodiment of this invention.
Figure 10B:
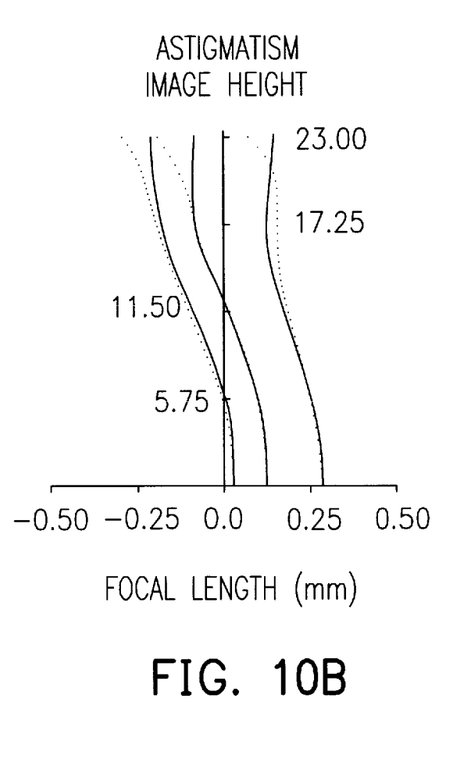
Figure 10C:
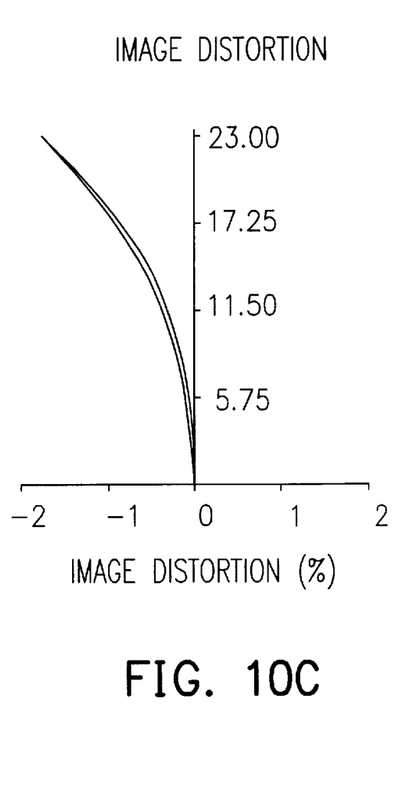

FIGS. 9A throug 9C are drawings, respectively showing the spherical aberration, astigmatism and distortion when the lens system 100 is operating at wide angle with focal length $f_W = 52.12$ mm, and an object distance of 2 m. Finally, FIGS. 10A throug 10C are graphs showing the respective spherical aberration, astigmatism and distortion when the lens system 100 is operating in tele mode with focal length $f_T = 72.97$ mm and an object distance of 2 m.

Figure 11:
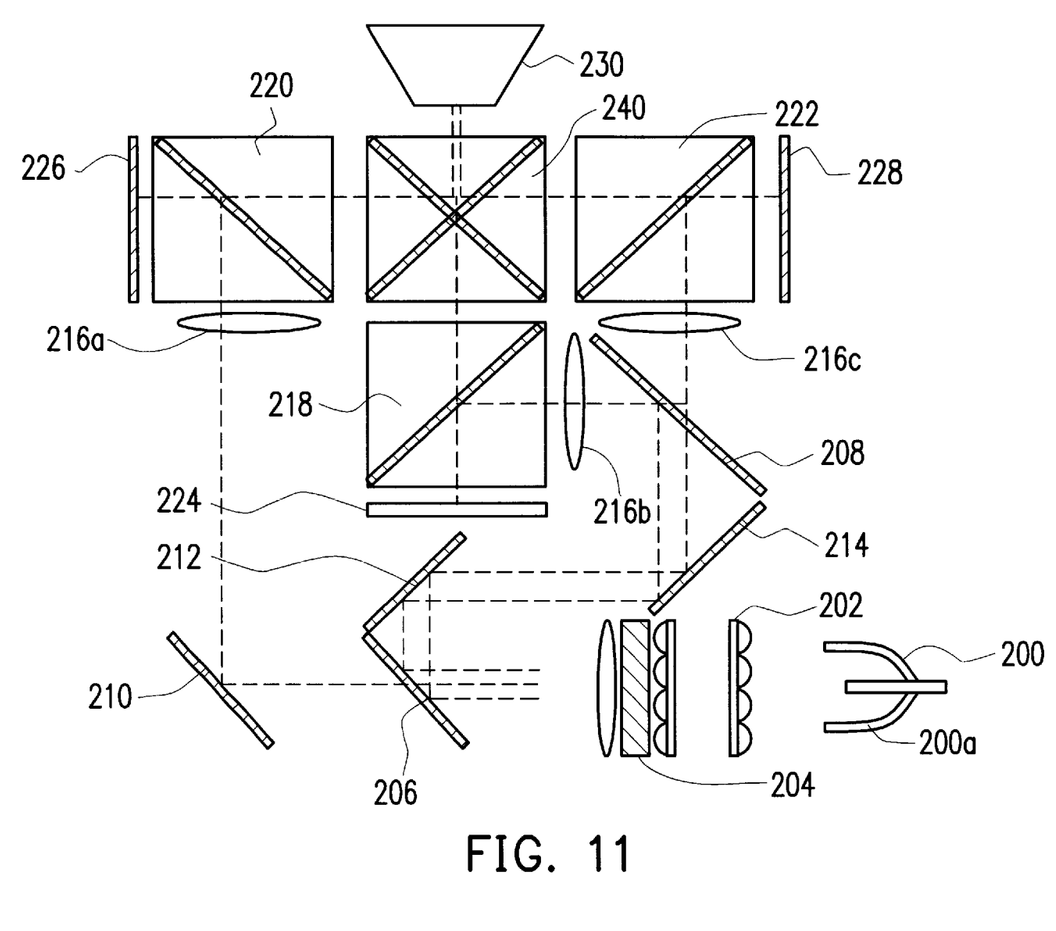
FIG. 11 is a schematic drawing of a projector system that uses the variable focus lens system of this invention.

FIG. 11 is a schematic drawing of a projector system that uses the variable focus lens system of this invention. Lights emitted from a white light source 200 are reflected by a parabolic reflector 200a on the backside of the light source 200, whereby a parallel light beam is generated and travel through an integrating lens array 202 and a polarizing beam splitter prism 204. The white light beam is then incident on a dichromic mirror 206, at which red (R) light beam of the white light beam is allowed to transmit but the blue (B) light and the green (G) light are reflected into mirrors 212 and 214, and into a dichromic mirror 208 At the dichromic mirror 208, the blue (B) light transmits the dichromic mirror 208 and travels through a collimator lens 216c and a polarizing beam splitter prism 222, and then enters a reflective liquid crystal panel 228. After reflection from the reflective liquid crystal panel 228, the beam re-enters the polarizing beam splitter prism 222. The green (G) light reflected by the dichromic mirror 208 travels through a collimator lens 216b and a polarizing beam splitter prism 218, and then enters a reflective liquid crystal panel 224. After reflection from the reflective liquid crystal panel 224, the beam re-enters the polarizing beam splitter prism 218. The red (R) light, after reflection by a reflector 210, travels through a collimator lens 216a and a polarizing beam splitter prism 220, and then enters a reflective liquid crystal panel 226. After reflection from the liquid crystal panel 226, the beam re-enters the polarizing beam splitter prism 220. The three primary colors red (R), blue (B) and green (G) then enter a color synthesizer 240 such as an X-prism where the three colors are combined together. As a result, the color light shines on the high-resolution variable focus lens system 230 for projection onto a screen.

In summary, one major aspect of this invention is the provision of a high-resolution variable focus lens system with an extra-long back focal length. Hence, the lens system is suitable for a liquid crystal projector that demands a long working distance for placing polarizing beam splitter prism and dichromic cross prism.

Another aspect of this invention is the telecentric design of the high-resolution variable lens system to collocate the illumination system. In this manner, the alignment of the three liquid crystal panels is much easier since the magnification of the high-resolution variable lens system is not affected by position error of the liquid crystal panel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A high-resolution variable focus lens system having an extra-long back focal length with telecentric design, comprising:

three groups of lenses positioned between a screen and an imaging panel, including:

a first group of lenses for zooming and focusing of the lens system, wherein the first group of lenses includes a first lens, a second lens and a third lens, and the first and the third lenses are positive lenses while the second lens is a negative lens, and the first group has a negative power in combination of the lenses;

a second group of lenses for zooming of the lens system, wherein the second group of lenses includes a fourth lens and a fifth lens, the fourth lens is a negative lens, and the fifth lens is a positive lens, and the second group has a negative power in combination of the lenses;

a third group of lenses for zooming of the lens system, wherein the third group of lenses includes a sixth, a seventh, an eighth, a ninth, a tenth and an eleventh lens, the sixth lens is a positive lens, the seventh lens is a negative lens, the eighth lens is a positive lens, the ninth lens is a negative lens, and the tenth and the eleventh lenses are positive lenses, and the third group has a positive power in combination of the lenses;

wherein the focal length of the lens system can be changed by varying a distance between the first group and the second group of lenses as well as the second group and third group of lenses along the optical axis, and furthermore, the variable focus lens system satisfies conditions as follows:

$$2.15 f_W \leq |f_1| \leq 2.89 f_W; \quad (1)$$

$$4.86 f_W \leq |f_2| \leq 9.82 f_W; \quad (2)$$

$$1.65 f_W \leq f_3 \leq 1.74 f_W; \quad (3)$$

$$0.37 f_3 \leq t_{12} \leq 0.42 f_3; \quad (4)$$

and $$N_6 \geq 1.66; \quad (5)$$

where $f_1$ to $f_3$ are focal length of the first, the second and the third group of lenses, respectively, $f_W$ is a focal length of the variable focus lens system in wide angle configuration, $t_{12}$ is the axial distance between the sixth lens and the seventh lens and $N_6$ is the refractive index of the sixth lens.

2. The lens system of claim 1, wherein the fourth and the fifth lenses in the second group is optionally cemented together to form a doublet.

3. The lens system of claim 1, wherein the seventh and eighth lenses in the third group are optionally cemented together to form a doublet.

4. The lens system of claim 1, wherein the first lens, the second lens, and the third lens of the first group comprise a positive biconvex lens, a negative meniscus lens, and a positive meniscus lens, respectively.

5. The lens system of claim 1, wherein the fourth and the fifth lenses of the second group comprise a biconcave lens and a biconvex lens.

6. The lens system of claim 1, wherein the fourth and the fifth lenses of the second group are optionally cemented together as a doublet.

7. The lens system of claim 1, wherein the sixth lens, the seventh lens, the eighth lens, the ninth lens, the tenth lens, and the eleventh lens of the third group comprise a positive biconvex lens, a negative biconcave lens, a positive biconvex lens, a plano-concave lens or a meniscus lens, a positive plano-convex lens, and a positive biconvex lens, respectively.

8. The lens system of claim 7, wherein the seventh and the eighth lens are cemented together.

9. A high-resolution variable focus lens system with an extra-long back focal length with a telecentric design, comprising:

three groups of lenses positioned between a screen and an imaging panel, including:

a first group of lenses for focusing and zooming of the lens system, having a negative power in combination of the lenses, wherein the first group of lenses includes a first lens, a second lens and a third lens, and the first and the third lenses are positive lenses while the second lens is a negative lens;

a second group of lenses for zooming of the lens system, having a negative power in combination of the lenses, wherein the second group of lenses includes a fourth lens and a fifth lens, the fourth lens is a negative lens, and the fifth lens is a positive lens;

a third group of lenses for zooming of the lens system, having a positive power in combination of the lenses, wherein the third group of lenses includes a sixth, a seventh, an eighth, a ninth, a tenth and an eleventh lens, and the sixth lens is a positive lens, the seventh lens is a negative lens, the eighth lens is a positive lens, the ninth lens is a negative lens, and the tenth and the eleventh lenses are positive lenses;

wherein focal length of the lens system can be changed by varying a distance between the first and the second group of lenses as well as the second and third group of lenses along the optical axis, and furthermore, the variable focus lens system satisfies conditions as follows:

$$2.15 f_W \leq |f_1| \leq 2.89 f_W; \quad (1)$$

$$4.86 f_W \leq |f_2| \leq 9.82 f_W; \quad (2)$$

$$1.65 f_W \leq f_3 \leq 1.74 f_W; \quad (3)$$

where $f_1$ to $f_3$ are focal lengths of the first, the second and the third group of lenses, respectively, and $f_W$ is a focal length of the variable focus lens system in wide angle configuration.

10. The lens system of claim 9, wherein the seventh lens and the eighth lens of the third group are cemented together.

11. The lens system of claim 9, wherein the first group of lenses includes a positive biconvex lens, a negative meniscus lens, and a positive meniscus lens with respect to a first lens, a second lens, and a third lens.

12. The lens system of claim 9, wherein the fourth and the fifth lens of the second group are optionally cemented together.

13. The lens system of claim 9, wherein the fourth and the fifth lens of the second group comprise a biconcave lens and a biconvex lens, respectively.

14. The lens system of claim 9, wherein the third group of lenses includes a positive biconvex lens, a negative biconcave lens, a positive biconvex lens, a plano-concave lens or a meniscus lens, a positive plano-convex lens, and a positive biconvex lens with respect to the sixth lens, the seventh lens, the eighth lens, the ninth lens, the tenth lens and the eleventh lens.

15. The lens system of claim 14, wherein the seventh and the eighth lens are cemented together.

16. The lens system of claim 9, wherein a ratio between a distance of separation between the sixth lens and the seventh lens in air along the optical axis and the focal length of the third group of lenses is about between 0.37 and 0.42.

17. The lens system of claim 9, wherein a refractive index of the sixth lens is greater than about 1.66.

* * * * *